2,296,485

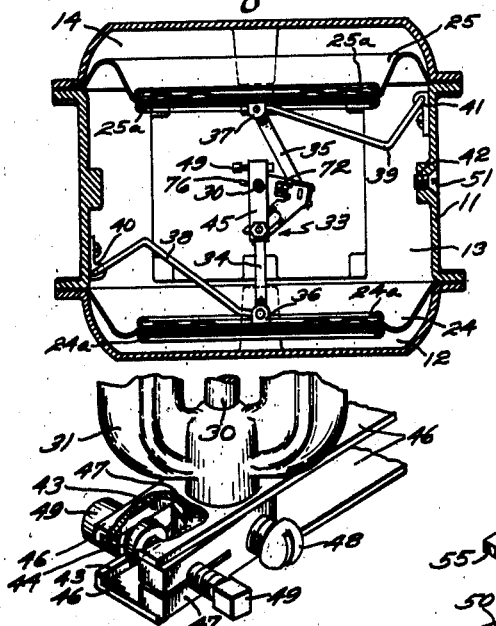
Sept. 22, 1942.   F. WHITWORTH   2,296,485
COMMON MEANS FOR ADJUSTING PLURAL CRANK ARM LENGTHS IN GAS METERS
Filed April 9, 1941   2 Sheets-Sheet 1
INVENTOR
Fairchild Whitworth,
By
ATTORNEY Sept. 22, 1942. F. WHITWORTH 2,296,485
COMMON MEANS FOR ADJUSTING PLURAL CRANK ARM LENGTHS IN GAS METERS
Filed April 9, 1941 2 Sheets-Sheet 2
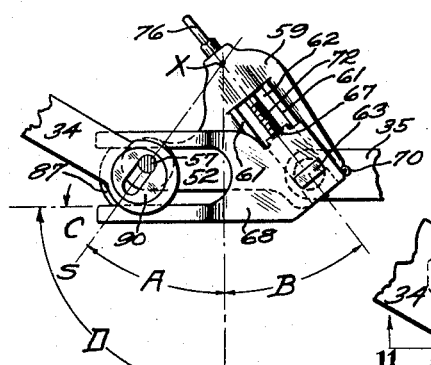
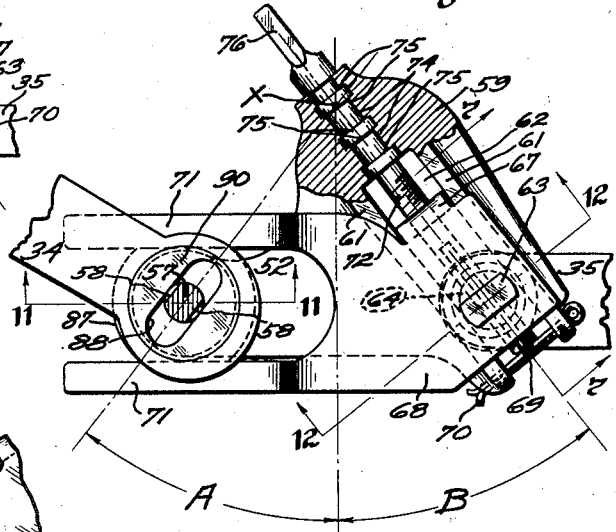
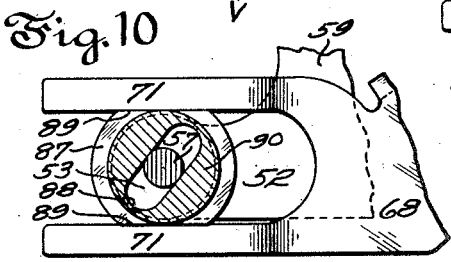
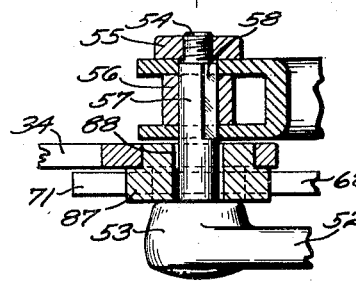
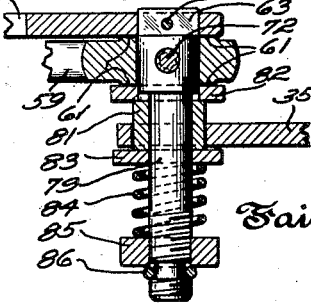
INVENTOR
Fairchild Whitworth,
BY
ATTORNEY Patented Sept. 22, 1942

UNITED STATES PATENT OFFICE 2,296,485

COMMON MEANS FOR ADJUSTING PLURAL CRANK ARM LENGTHS IN GAS METERS

Fairchild Whitworth, Fairfield, Conn., assignor to The Sprague Meter Company, Bridgeport, Conn., a corporation of Connecticut Application April 9, 1941, Serial No. 387,649

21 Claims. (Cl. 73—281)

This invention relates to mechanisms for varying simultaneously and to like extent the distance through which separate cooperative diaphragms in a gas meter are permitted to reciprocate while simultaneously linked to a multiple armed crank which assists in transmitting the diaphragm movements to the register of the meter.

One object of these improvements is to provide means whereby the adjustive shifting of some preferably single accessible element produces a like change in the effective "throw" of the plural crank arms with respect to plural diaphragms, respectively, where such diaphragms are connected to such crank arms by separate pitman links.

A further object is to provide means for varying, and preferably to like extent, the radial distances from the axis of a crank structure to a plurality of circumferentially spaced crank pins or pivot affording devices serving a similar purpose carried by the crank structure while such devices are engaged respectively by a plurality of pitman links whose paths of swinging travel overlap.

A still further object is to provide rugged, positive and more simple means for simultaneously varying the effective length of two angularly related crank arms by use of mechanism employing fewer parts than that proposed for an analogous purpose in the copending application of Arthur S. McIntire, Serial No. 219,851, filed July 18, 1938.

The above and related objects are explained in greater detail in the following description of structure illustrative of one possible form of the invention, in which description reference is had to the accompanying drawings wherein:

Fig. 1 is a view in side elevation of the diaphragm operated crank mechanism within a Sprague type of gas meter, the meter casing framework and certain of the associated valve operating apparatus being broken away and shown in section.

Fig. 2 is a plan view taken in section on the planes 2—2—2—2 in Fig. 1.

Fig. 3 is an enlarged perspective view of the assembled bearing bracket, crank shaft, and crank arm removed from the meter of Fig. 1.

Fig. 4 is an exploded view corresponding in scale and position with Fig. 3 of one of the diaphragm connecting links with its adjustable crank connecting collar.

Fig. 5 is a perspective view, corresponding in scale and position to Figs. 3 and 4, showing the crank plate and parts carried thereby.

Fig. 6 is an exploded perspective view corresponding in scale and position to Figs. 3, 4 and 5, showing the other diaphragm connecting link with retaining means therefor.

Fig. 7 is a fragmentary view taken in section on the plane 7—7 in Fig. 9.

Fig. 8 is an edgewise fragmentary view of the tangent arm and adjustable crank structure as appearing in Fig. 1 drawn on a larger scale.

Fig. 9 is a plan view taken in section on the plane 9—9 in Fig. 8.

Fig. 10 is a fragmentary plan view taken in section on the plane 10—10 in Fig. 8.

Fig. 11 is a fragmentary view taken in section on the plane 11—11 in Fig. 9, looking in the direction of the arrows.

Fig. 12 is a fragmentary view taken in section on the plane 12—12 in Fig. 9, looking in the direction of the arrows.

Fig. 13 is a view similar to Fig. 9 drawn on a reduced scale showing the effective lengths of the crank arms increased to a maximum.

Fig. 14 is a view similar to Fig. 13 showing the effective lengths of the crank arms reduced to a minimum.

Fig. 15 is a fragmentary perspective view of the adjustable connection between the crank structure and its shaft.

Figs. 1 and 2 illustrate a typical gas meter of the Sprague type in which the present improvements may be incorporated. Such meter may include a casing 11 containing three gas measuring chambers 12, 13 and 14, a distributing chamber 15 and an exhaust passageway 16. The usual flexible diaphragms 24 and 25 separate measuring chambers 12, 13 and 13, 14, respectively.

A centrally hollowed-out valve disc 19 gyrates edgewise in sliding contact with the upper valve seat edges of partitions 20 which separate adjacent passageways providing communication between distributing chamber 15 and measuring chambers 12, 13 and 14. This serves to open and close these passageways in predetermined sequence and timed relationship. Valve disc 19 further acts as a valve to control communication between the said passageways and a central well 21 giving to the exhaust passageway 16. By this valve action of disc 19, the flow of gas into and out of the measuring chambers is governed in a manner to cause reciprocative excursion of diaphragms 24 and 25 in a manner that is fully described in U. S. Patent No. 722,390, granted March 10, 1903, to Henry H. Sprague.

Disc 19 further carries a projecting boss 26 which revolves therewith and rotatively drives the radial arm 27 of the meter register 28 located at the top front portion of the meter. The bottom end of boss 26 is pivotally engaged by an upstanding driving pin 29 which revolves with the vertical crank shaft 30. This shaft is journaled in a bearing bracket 31 which depends from and is removably mounted in fixed relation to the interior frame-work of the meter. All of the meter parts and apparatus so far mentioned may be constructed and operate as is explained in greater detail in the copending application of Arthur S. McIntire, Serial No. 219,851.

The lower end of crank shaft 30 projects below the bottom end of bracket 31 and carries thereat a crank structure indicated as a whole by 33, shown most fully in Figs. 3, 5, 8, 9, 13 and 14. This crank structure is operatively coupled through pitman links 34, 35 to diaphragms 24 and 25, respectively, as best shown in Figs. 1 and 2. The central portions of these diaphragms may include disc-like plates 24a and 25a clamping between them the flexible leather of the diaphragms and carrying respectively the hinge brackets 36 and 37. As in older patented constructions of the Sprague meter, and for steadying and guiding each diaphragm in a definite path of back-and-forth movement, the hinge brackets 36 and 37 are movably guided respectively by bent-rod arms 38 and 39 which are swingably mounted, respectively, in stationary hinge brackets 40 and 41 secured to walls of the casing structure within the central measuring chamber.

The before mentioned pitman links 34 and 35 have their diaphragm connecting ends pivotally coupled with the diaphragm carried hinge brackets 36 and 37, respectively, and their opposite ends are pivotally coupled with the crank structure 33. Important features of this crank structure as operatively related to pitman links 34 and 35 are novel with this invention.

The crank structure 33 includes a composite holding arm indicated as a whole by 45 which includes a rigid channel member 46 having a rotatably adjustable fit upon shaft 30 below bracket 31. Channel member 46 contains sandwiched between its top and bottom flanges and filling said space a rocking lever 47 for the purpose of holding member 46 in variously adjusted rotative relationships on shaft 30. This rocking lever is fixed on shaft 30 by means of a set screw 48. As and for the purpose set forth in U. S. Patent No. 1,892,520, granted to H. H. Sprague, an adjusting screw 49 can be employed to determine and vary the rotative angular relation of member 46 to lever 47 with respect to the crank axis X. This screw has threaded engagement with a split friction affording portion of lever 47 and a groove 44 in its shank is engaged by lips 43 of member 46. Thus a flatted hole 50 through the top and bottom flanges of the free end of channel member 46 may be swung adjustively to and maintained in positively established rotative positions with respect to shaft 30 roughly by means of screw 48 and finely by screws 49. This or equivalent means of adjustment is employed for timing or synchronizing the opening and closing of the ports or passageways controlled by the gyratory movement of disc 19 in relation to the excursions of movement performed by the diaphragms.

All of the rest of the crank structure 33 is suspended in rigid and spaced relation to holding arm 45 by means of a vertical post 57 whose upper portion is flatted at 58 to tightly fit the flatted holes 50 in the flanges of member 46. As shown in Fig. 11, a sleeve 56 surrounds pin 57 and internally reinforces the flanges of channel member 46 to help them withstand the pressure of a retaining nut 55 when the latter is set up in threaded engagement with the top end 54 of pin 57 for firmly clamping member 46 against the shoulders on pin 57 afforded by the bottom ends of the flats 58. The lower end of post 57 may be fixedly embedded in the thickened terminus 53 of one branch 52 of a die casting forming the crank plate 59 which thus constitutes part of the crank structure. Other suitable means for making post 57 fast both to channel member 46 and crank plate 59 may be employed. However, by the construction described crank plate 59, while removable for repair, is at all times carried as rigidly and as fixedly held in spaced relation to holding arm 45 as though these two sections of the crank structure 33 constituted an integral structure.

Crank plate 59 is provided with an elongated cut-out 62 whose opposite edges are bordered at top and bottom by ridge-like ways 61 along which block 64 may adjustively be moved. Block 64 may be either cylindrical or flat-sided in either case filling the width of and slidingly fitting the cut-out 62. This block is provided with an upstanding slabbed top end 63 which receives, tightly fits, and is riveted over against an adjuster yoke 68 thus made fast to block 64 by seating on its slab formed shoulders so that yoke 68 and block 64 form in effect an integral rigid structure. A cross pin 69 may be inserted tightly through yoke 68 and the slabbed end 63 of block 64 further to insure strength and rigidity in the relationship of these two parts. In alternative constructions, yoke 68 might be produced as a casting in which case block 64 would be cast integrally therewith. Yoke 68, as best shown in Figs. 7 and 9, may be equipped with a down-turned lug 67 which is wide enough to form a sliding fit in cut-out 62 and thereby helps prevent any swinging of yoke 68 about the vertical axis of block 64.

Block 64 further has a downward extending shank 79 integral therewith and threaded for some distance from its lower end. Shank 79 is maintained firmly in perpendicular relationship to the plane of rotation of crank plate 59 by means of a thrust washer 82 which slidably fits the periphery of block 64 and which is constantly thrust upward against the bottom ways 61 on crank plate 59 through the medium of a collar 81 and a washer 83 by the expansive force of a coil spring 84 retained by nut 85 having threaded engagement with shank 79. Nut 85 is guarded against excessive loosening by a horseshoe type of spring retainer 86 lodged in a groove cut in the threaded portion of shank 79. Collar 81 and washer 82 are freely slidable on shank 79. It will be observed that the thickness of thrust washer 82 is such that collar 81 exerts its thrust thereupon instead of on the shoulder where shank 79 joins block 64. Thus spring 84 acts to keep the crank plate ways 61 squeezed between yoke 68 and thrust washer 82 so as to prevent any play between these parts and keep them steady in every adjusted position while affording frictionally opposed slidability to block 64 along the cut-out 62.

Block 64 is moved to and held in selective stations lengthwise of cut-out 62 by the adjustor screw 72 whose length occupies this cut-out and has threaded engagement with a tapped hole in block 64. Screw 72 also passes through and is slidably free in a non threaded clearance hole in lug 67 of the yoke 68. An unthreaded portion 74 of the length of screw 72 which passes through the crank plate 59 has spaced grooves defining thrust shoulders 75 and is rotatably embedded in the crank plate with a small enough degree of resistive tightness to enable said screw to be turned by means of its projecting head 76 which is flatted or squared to receive a socket wrench or other suitable tool which preferably will likewise fit and turn the head of the before mentioned valve timing adjustment screw 49. Both of these screws extend in the direction of a casing opening 42 in order that their heads may both be reached for adjustive turning by a wrench inserted through this casing opening when the crank structure 33 occupies a single position. A cotter pin 70 may be employed to bridge the open end of cut-out 62 as a guard to prevent block 64 from being shifted too far outwardly by the turning of adjustor screw 72.

One end of pitman link 35 is pivotally engaged with the bushing 81 so that the radial distance from the axis of rotation of crank structure 33 to the point of pivotal connection of link 35 to this crank structure varies with the adjustive movement of block 64 along its plate cut-out 62. The objective of correspondingly, and by a common means, causing a similar variation to take place in the radial distance from the same axis of crank rotation to the point of pivotal connection of pitman link 34 to the crank structure is accomplished by devices which may be similar to those disclosed in the aforesaid copending application, Serial No. 219,851.

Yoke 68 carries a wide forked end 71 which straddles and slidingly fits a shiftable collar 87 that functions as an adjustable "crank pin." Collar 87 has the elongated slot 88 extending completely through it. Post 57 extends through this slot, being of cross sectional size to fill the width thereof and to permit lateral sliding of collar 87 relative to post 57 but only in the direction in which this slot extends. When post 57 is cylindrical, as shown in the drawings, the portion of the axial length of collar 87 which engages with the forked end 71 of yoke 68 is shaped to provide the flat sides 89 which slidingly fit the forked end 71 of the yoke and prevent collar 87 from rotating. Thus slot 88 is always maintained in designed radial alignment relative to the axis of rotation of the crank structure. Other ways of confining collar 87 to adjustive movement in a straight radial line intersecting the axis of rotation of the crank are set forth in the aforesaid copending application Serial No. 219,851. Pitman link 34 pivotally engages the cylindrical portion 90 of collar 87 which latter rests freely and slidably on the thickened terminus 53 of crank plate 59.

In the operation of the meter the adjustable crank pin device 64, 79, etc. and also the collar device 87 are cooperatively pushed and pulled by the diaphragm motivated pitman links 34 and 35 in such manner as to impel crank structure 33 continually in a constant direction of rotation so long as gas continues to pass into and out of measuring chambers 12, 13 or 14. Shaft 30 and its eccentrically carried drive pin 29 thereby cause valve disc 19 to gyrate edgewise while resting on the top edges of partitions 20 in a manner to open up and cut off fluid communication not only between distributing chamber 15 and the passageways which lead to the measuring chambers but also between these measuring chambers and the central well 21. In the usual manner of the Sprague type of meter, valve disc 19 thus controls and times the intake and output of gas with respect to each of the measuring chambers. The disc carried boss 26 as usual impels a radial arm 27 to drive the register 28.

If this timing of the intake and output of gas is found to require correction, screw plug 51 may be removed from its hole 42 in the meter casing wall and a wrench (not shown) may be inserted through this hole to reach and turn the adjusting screw 49 in either direction. This will change the angular or rotative relation of arm 45 to shaft 30 in a finely controllable degree.

If upon comparison of the register reading with a test standard it is found that the register indication is incorrect for the true amount of gas which has passed through the meter, the same wrench may be employed at the same time to turn adjustor screw 72 in either direction. This will slide block 64 either toward or away from the axis X of shaft 30. At the same time, the coupler yoke 68 will move in unison with block 64 and in the same direction so as simultaneously to shift the collar device 87 toward or away from this same axis of the crank structure a linear extent exactly equal to the corresponding adjustive movement of crank pin device 64. But this movement of collar device 87 is restricted to a direction radial to axis X along the line SX (Fig. 13) at all times by the snug though free sliding engagement of the flat sides 89 of collar device 87 with the flat edged fork arms 71 of yoke 68 (Fig. 10).

In the construction herein chosen to illustrate the invention, these straight edged arms of the yoke fork 71 are shown to extend horizontally in Fig. 13. Thus they are always perpendicular to an imaginary vertical construction line VX intersecting the axis of rotation X, because the yoke can never change its angular relation to cut-out 62 in crank plate 59 owing both to its fixity on slidable block 64 and to its lug 67 being guided in cut-out 62. VX may be considered to bisect the angle formed by SX and the longitudinal axis of adjustor screw 72 so that angle A and angle B are each equal, say, to forty degrees. This results in angle C remaining constantly fifty degrees in all of the differently adjusted relationships of the parts indicated in Figs. 9, 13 and 14, so that slot 88 remains at all times aligned with SX thus restricting the shifting of collar device 87 so that it must take place in the direction SX and in increments exactly equal to the linear extent of adjustive movement of crank pin device 64 in its different direction axially of screw 72 along the cut-out 62 in crank plate 59. In other words the relationship of the aforesaid 80 degree angle A plus B to the 50 degree angle C causes the straight edges 89 of yoke fork 71 to fall in lines which if extended to intersect SX and the axis of screw 72 would form the base of isosceles triangles of which SX and the axis of screw 72 comprise the sides. By geometrical principles the approach of the base of an isosceles triangle toward the apex of such triangle shortens the sides of the triangle by equal amounts which is the result herein desired and achieved with respect to simultaneous shortening and lengthening of the two crank arm distances.

The above described simultaneous varying, in exactly like increments, of the distances from the crank axis X to the points of pivotal connections of both links 34 and 35 will be seen to alter to exactly like extent the distance through which each of diaphragms 24 and 25 moves corresponding to one full revolution of crank structure 33. The passage of a given volume of gas through the meter will therefore cause the register to indicate an increased or reduced amount of gas consumption while both diaphragms continue to flex reciprocatively through like distances. In this manner the meter reading and performance may be calibrated as desired without, as has heretofore been the practice, inflicting upon one of the meter diaphragms a greater amount of flexural fatiguing movement than is performed by the other diaphragm.

Fig. 13 shows both block 64 and collar device 87 shifted to their radial outermost positions which increases the effective throw of both arms of the crank to a maximum, while Fig. 14 shows these same parts adjusted to their radially innermost positions which decreases the effective throw of both arms of the crank to its minimum.

It will be understood in regard to the construction shown in Fig. 9 that the metal of crank plate 59, if die cast, may be molded about the shank of screw 72 to form a close fitting bearing therefor, or this crank plate may be sandwiched into two halves each of which halves may be grooved so that the grooves register to form a complete bearing when the crank plate halves are placed together, in which assembled condition they may be held by screws or any desired form of fastening means.

Guide lug 67 may be omitted from yoke 68 if block 64 is made with flat sides slidingly engaging the side walls of cut-out 62 and sufficiently long to prevent block 64 from swiveling about its vertical axis in said cut-out.

The novel principles underlying the present improvements may be seized upon and embodied in constructions and relationships of parts differing from those herein chosen for the purpose of illustrating the invention, and the appended claims are intended to cover all substitutes and equivalents that would be suggested by the disclosure hereof or which come within the fair meaning of their terms.

I claim:

1. In register driving apparatus for gas meters including a rigid crank structure rotatable about a crank axis and comprising a crank plate held fast to a crank arm by a post eccentric to said axis affording axial space between said plate and arm, the combination with said crank structure of, a collar device within said axial space surrounding said post and shiftable relative thereto, means restricting shifting movement of said collar device to directions toward or away from said crank axis, a crank pin device angularly spaced from said post in the arc of rotation of said crank structure adjustably carried by said plate in a manner to project away from said space in a direction parallel to said axis, a push-pull screw having threaded and unthreaded sections one of which sections so operatively engages with said crank structure and the other of which sections so cooperatively engages with said crank pin device that turning of said screw moves said crank pin device adjustively in relation to said plate, and connections between said screw and said collar device constructed and arranged to convert said turning movement of the former into shifting movement of the latter in its said directions.

2. In a flow meter, fluid operated mechanism including the combination of, a crank plate having a pivotal axis, a crank pin device carried by said plate and adjustable relative thereto to positions relatively near and relatively far from said axis, means to constrain said device to a predetermined path of adjustive movement, a post fixed on said crank plate spaced from said crank pin device, a collar device surrounding said post constructed and arranged to be adjustably slidable in relation thereto to positions relatively near and relatively far from said axis, means to constrain said collar device to a different predetermined path of adjustive movement, and a rigid coupler fixedly carried by one of said devices and extending into operative engagement with the other of said devices in a manner to cause the latter to be adjustively moved simultaneously with the former.

3. In a flow meter, fluid operated mechanism including the combination of, a crank plate having a pivotal axis, a crank pin device carried by said plate and adjustable relative thereto to positions relatively near and relatively far from said axis, means to constrain said device to a predetermined path of adjustive movement, a post fixed on said crank plate spaced from said crank pin device, a collar device surrounding said post constructed and arranged to be adjustable in relation thereto to positions relatively near and relatively far from said axis, means to constrain said collar device to a different predetermined path of adjustive movement, and a rigid coupler fixedly carried by said crank pin device and extending into operative engagement with said collar device in a manner to cause the latter to be adjustively moved simultaneously with the former.

4. In a flow meter, fluid operated mechanism including the combination of, a crank plate having a pivotal axis, a crank pin device carried by said plate in adjustably slidable relation thereto, means to constrain said device to a straight path of adjustive movement radial to said axis, a post fixed on said crank plate spaced from said crank pin device, a collar device surrounding said post constructed and arranged to be adjustably slidable in relation thereto, means to constrain said collar device to a different straight path of adjustive movement radial to said axis, and a rigid coupler fixedly carried by one of said devices and extending into operative engagement with the other of said devices in a manner to cause the latter to be adjustively moved simultaneously with the former.

5. In a flow meter, fluid operated mechanism including the combination of, a crank plate having a pivotal axis, a crank pin device carried by said plate and adjustable relative thereto to positions relatively near and relatively far from said axis, means to constrain said device to a predetermined path of adjustive movement, a post fixed on said crank plate spaced from said crank pin device, a collar device surrounding said post constructed and arranged to be adjustably slidable in relation thereto to positions relatively near and relatively far from said axis, means to constrain said collar device to a different predetermined path of adjustive movement, and a rigid coupler fixedly carried by one of said devices and extending into operative engagement with the other of said devices in a manner to cause the latter to be adjustively moved simultaneously with the former, together with means to prevent swiveling relative to said plate of the device which fixedly carries said coupler.

6. In a flow meter, fluid operated mechanism including the combination of, a crank plate having a pivotal axis, a crank pin device carried by said plate and adjustable relative thereto to positions relatively near and relatively far from said axis, means to constrain said device to a predetermined path of adjustive movement, a post fixed on said crank plate spaced from said crank pin device, a collar device surrounding said post constructed and arranged to be adjustable in relation thereto to positions relatively near and relatively far from said axis, means to constrain said collar device to a different predetermined path of adjustive movement, and a rigid coupler fixedly carried by said crank pin device and extending into operative engagement with said collar device in a manner to cause the latter to be adjustively moved simultaneously with the former, together with means to prevent swiveling of said crank pin device relative to said plate.

7. In a flow meter, fluid operated mechanism including the combination of, a crank plate having a pivotal axis, a crank pin device carried by said plate in adjustably slidable relation thereto, means to constrain said device to a straight path of adjustive movement radial to said axis, a post fixed on said crank plate spaced from said crank pin device, a collar device surrounding said post constructed and arranged to be adjustably slidable in relation thereto, means to constrain said collar device to a different straight path of adjustive movement radial to said axis, and a rigid coupler fixedly carried by one of said devices and extending into operative engagement with the other of said devices in a manner to cause the latter to be adjustively moved simultaneously with the former, together with means to maintain said coupler in constant angular relation to said straight radial paths when said devices are adjustively moved in their different said paths.

8. In a flow meter, fluid operated mechanism including the combination of, a crank plate having a pivotal axis, a crank pin device carried by said plate in adjustably slidable relation thereto, means to constrain said device to a straight path of adjustive movement radial to said axis, a post fixed on said crank plate, a collar device surrounding said post constructed and arranged to be adjustable in relation thereto, means to constrain said collar device to a straight path of adjustive movement radial to said axis, and a rigid coupler fixedly carried by said crank pin device and extending into operative engagement with said collar device in a manner to cause the latter to be adjustively moved simultaneously with the former, said coupler having an elongated straight collar actuating and steering surface slidingly engaged with said collar device in a manner to prevent the latter from swiveling relative to said post, together with means to maintain said coupler in constant angular relation to said straight radial paths when said devices are adjustively moved in said paths respectively.

9. In a flow meter, fluid operated mechanism including the combination defined in claim 8, in which the said straight guide surface of the said coupler extends in such direction that when projected to intersect both of the said straight radial paths the projection of said guide surface forms an angle of equal degrees with each of said paths.

10. In a flow meter, fluid operated mechanism including the combination of, a crank plate having a pivotal axis, a crank pin device carried by said plate and adjustable relative thereto to positions relatively near and relatively far from said axis, means to constrain said device to a predetermined path of adjustive movement, a post fixed on said crank plate spaced from said crank pin device, a collar device surrounding said post constructed and arranged to be adjustably slidable in relation thereto to positions relatively near and relatively far from said axis, means to constrain said collar device to a different predetermined path of adjustive movement, friction producing means acting between one of said devices and said crank plate to hold said one of the devices firmly yet yieldingly in its said adjusted positions, and a rigid coupler fixedly carried by one of said devices and extending into operative engagement with the other of said devices in a manner to cause the latter to be adjustively moved and held simultaneously with the former.

11. In a flow meter, fluid operated mechanism including the combination of, a crank plate having a pivotal axis, a crank pin device carried by said plate and adjustable relative thereto to positions relatively near and relatively far from said axis, means to guide said device in a predetermined path of adjustive movement, a post fixed on said crank plate spaced from said crank pin device, a collar device surrounding said post constructed and arranged to be adjustable in relation thereto to positions relatively near and relatively far from said axis, means to constrain said collar device to a different predetermined path of adjustive movement, spring urged thrust applying instrumentalities acting between said crank pin device and said crank plate to hold said crank pin firmly and frictionally in various adjusted positions in its said path, and a rigid coupler fixedly carried by said crank pin device and extending into operative engagement with said collar device in a manner to cause the latter to be adjustively moved and held simultaneously with the former.

12. In a flow meter, fluid operated mechanism including the combination defined in claim 7, in which the said means to constrain the said crank pin device to a straight path of adjustive movement includes an elongated cut-out in the said crank plate, and the said rigid coupler has an elongated portion in alignment with said cutout, together with a guide lug carried by said elongated coupler portion in spaced relation to said crank pin device and slidably engaged with said cut-out to assist in maintaining said alignment.

13. In a flow meter, fluid operated mechanism including the combination defined in claim 8, in which the said collar device has an elongated straight slot of width to slidably fit and be occupied by the said post, said slot being maintained by the said straight collar actuating and steering surface of the said coupler in aligned relation to the said straight radial path in which said collar device is adjustively movable.

14. In a flow meter, fluid operated mechanism including the combination defined in claim 8, in which the said collar device has an elongated straight slot of width to slidably fit and be occupied by the said post and also has spaced parallel straight sides inclined at a fixed angle to said slot, and in which the said coupler includes a fork straddling said collar device and having elongated straight-edged arms slidably engaged with said straight sides of said collar device in a manner to actuate the latter and at the same time to maintain said collar slot in constant true alignment with the said straight radial path in which said collar device is adjustable.

15. In fluid operated mechanism for a flow meter, the combination with a crank structure, of a collar device carried by and adjustably movable in a predetermined path on said structure, a crank pin device including a block, guide ways on said structure slidably engaging said block, and a member for operatively coupling said devices comprising a rigid fork-shaped member having a shank end portion fixed on said block and a bifurcated end portion slidably engaged with said collar device.

16. In fluid operated mechanism for a flow meter, the combination defined in claim 15, in which the said guideways are formed in part by the side walls of a cut-out portion of the said crank structure, and the said shank end portion of the said coupling member comprises a relatively thin and relatively wide plate-like body overhanging the said side walls of said cut-out portion of said crank structure and slidably engaging the latter in a manner to provide a thrust bearing for steadying the said crank pin device.

17. In a flow meter, fluid operated mechanism including the combination defined in claim 8, in which the said straight paths of adjustable movement are inclined toward each other at an angle of eighty degrees, and the said straight guide surface of the said coupler is inclined relative to one of said straight paths at an angle of fifty degrees.

18. Fluid operated mechanism for driving the register of a flow meter, including the combination of, a crank structure rotatable about a crank axis, a crank pin device and a cooperative collar device carried adjustably by said crank structure in a manner to be shiftable thereon in respectively different paths relative to said crank axis, and means for coupling said devices operatively together also carried by said crank structure and comprising a rigid member having a shank portion fixed to said pin device and a bifurcated portion straddling and engaging slidably with said collar device thereby to enable adjustive shifting of one of said devices to cause adjustive shifting of the other of said devices.

19. Fluid operated mechanism for driving the register of a flow meter as described in claim 18, in which the said shank portion of the said coupling means comprises a relatively thin and relatively wide plate-like body having a flat sided aperture adapted to receive and closely fit a correspondingly shaped portion of the said crank carried pin device, thereby to prevent relative swiveling movement between said shank portion and said pin device.

20. In a flow meter, fluid operated mechanism including the combination of, a crank plate having a pivotal axis, a post fixed on said crank plate, a collar device surrounding said post constructed and arranged to be adjustably slidable relatively to said post to positions nearer to or farther from said axis, and a slidable structure carried by said plate and adjustable both relatively thereto and relatively to said collar device to positions nearer to or farther from said axis including a crank pin device and rigid coupler fixedly connected thereto extending into operative engagement with said collar device in a manner to cause the latter to be adjustively moved simultaneously with said crank pin device, together with separate means constructed and arranged separately to constrain said collar device and said slidable structure to angularly related paths of adjustive movement.

21. In a flow meter, fluid operated mechanism including the combination of, a crank plate having a pivotal axis, a post fixed on said crank plate, a collar device surrounding said post constructed and arranged to be adjustably slidable relatively to said post to positions nearer to or farther from said axis, and a slidable structure carried by said plate and adjustable both relatively thereto and relatively to said collar device to positions nearer to or farther from said axis, said slidable structure including a crank pin device and rigid coupler fixedly connected thereto extending into operative engagement with said collar device in a manner to cause the latter to be adjustively moved simultaneously with said crank pin device, actuating means operatively engaged with said slidable structure in a manner to adjustively move the latter in a predetermined direction, and separate means to constrain said collar device to a path of adjustive movement angularly related to said direction.

FAIRCHILD WHITWORTH.